United States Patent [19]

Ambrosi

[11] Patent Number: 4,850,567
[45] Date of Patent: Jul. 25, 1989

[54] BALL VALVE

[75] Inventor: Martin J. Ambrosi, Herbrechtingen, Fed. Rep. of Germany

[73] Assignee: Max Widenmann Armaturenfabrik, Fed. Rep. of Germany

[21] Appl. No.: 108,692

[22] Filed: Oct. 15, 1987

[30] Foreign Application Priority Data

Oct. 29, 1986 [DE] Fed. Rep. of Germany ....... 3636856

[51] Int. Cl.⁴ .................... F16D 7/06; F16K 31/44
[52] U.S. Cl. .................... 251/81; 192/56 R; 251/315; 464/36
[58] Field of Search ............ 251/79, 81, 304, 315; 192/38, 56 R; 464/35, 36

[56] References Cited

U.S. PATENT DOCUMENTS

| | | | |
|---|---|---|---|
| 1,805,692 | 5/1931 | Ferenci | 192/56 R |
| 2,291,151 | 7/1942 | Dunn | 192/38 |
| 2,860,498 | 11/1958 | Crossley | 464/35 |
| 2,875,601 | 3/1959 | Georges | 464/36 |
| 3,414,097 | 12/1968 | Denkowski | 192/38 |
| 3,942,337 | 3/1976 | Leonard et al. | 464/36 |
| 3,988,891 | 11/1976 | Hoyler | 251/81 |
| 4,006,608 | 2/1977 | Vuceta | 192/56 R |
| 4,294,340 | 10/1981 | Kunze | 464/36 |
| 4,619,437 | 10/1986 | Williams et al. | 251/81 |
| 4,635,771 | 1/1987 | Shoji et al. | 192/56 R |

FOREIGN PATENT DOCUMENTS 1201624 9/1965 Fed. Rep. of Germany .... 192/56 R

Primary Examiner—George L. Walton
Attorney, Agent, or Firm—Gerald J. Ferguson, Jr.

[57] ABSTRACT

A ball valve is provided with a blocking mechanism which automatically blocks its control shaft in its respective rotary position between a closure position and an open position when the control movement takes place too rapidly. The blocking mechanism responds to the respective rotary position of an annular inertia body which is rotatably mounted on the ball valve housing and the rotary movement of which effected by spring action is initiated by the rotation of the control shaft and is retarded by its inertia. On adequately slow actuation of the control shaft the blocking mechanism does not become operative. When the actuation is too rapid and could lead to potentially damaging high pressure peaks the control shaft is blocked by the blocking mechanism.

8 Claims, 2 Drawing Sheets

BALL VALVE

BACKGROUND OF THE INVENTION

1. Field of the Invention

The present invention relates to a ball valve comprising a spherical shutoff body which is moveable between closure and open positions by rotating a control shaft rotatably mounted in the ball valve housing.

2. Description of the Prior Art

Ball valves have a small space requirement for a given flow cross-section and are therefore widely used in particular in mobile equipment. Thus, ball valves are widespread as shutoff members in fire-fighting equipment. The shift travel between open position and closure position in ball cocks or valves is generally only 90° angle of rotation. The opening or closing of a ball valve is thus possible even under pressure within a fraction of a second. However, too rapid opening or closing leads to pressure peaks which can overload the conduit elements. Pressure peaks occurring on sudden opening or closing of ball valves can also lead to uncontrolled and dangerous movements of loosely laid conduits or hoses. Actuation of ball valves under pressure must therefore take place slowly enough to avoid occurrence of potentially damaging high pressure peaks. To presently meet this requirement operation by trained personnel is necessary. Nevertheless, in fire-brigade uses operating errors can be made which lead to damaging of the material or endangering of the personnel.

SUMMARY OF THE INVENTION

The present invention provides a ball valve wherein too rapid opening or closing is reliably prevented by means of a simple and reliable blocking mechanism.

According to the invention in the ball valve of the type set forth at the outset the control shaft is connected to a blocking mechanism for blocking the control shaft in its respective position between closure and opening positions. The blocking mechanism responds to the rotational position of an inertia body which is rotatably mounted in the ball valve housing and the rotary movement of which as produced by spring action is initiated by rotation of the control shaft and retarded by the inertia of said body. If the shift or control shaft is actuated too rapidly the inertia body whose rotary movement caused by the spring action is retarded by its inertia, will not reach its rotary position in which the function of the blocking, mechanism is prevented. Consequently, on too rapid actuation of the shift valve an automatic response of the blocking mechanism takes place so that the shift valve cannot be further rotated. The blocking mechanism also however responds to rotary movements of the spherical shutoff body which may be effected by the flowing medium. For in particular in the vicinity of the closure position there is a danger that the shutoff body by flow influences is suddenly turned into its closure position and this would also lead to potentially damaging high pressure peaks. Thus, the invention also achieves prevention of undesired abrupt displacement of the shutoff body by flow influences.

In preferred embodiments of the invention an automatic blocking takes place on too rapid actuation in both actuating directions. In such embodiments the inertia body is held by one or more springs in a centre position and in a rotary position deviating from said centre position is urged by said springs in the direction of said centre position.

In a particularly simple but nevertheless reliably operating embodiment of the invention, the blocking means consists of two annular form-locking structures which lie opposite each other a radial distance apart and of which the one is connected to the inertia body and the other is fixed with respect to the housing, and of at least one rolling element which is disposed between the two annular formlocking structures and via which a driver is coupled to the shift shaft. The form-locking structures each have troughs which are arranged in opposing pairs, follow each other in the peripheral direction and are separated from each other by webs and the form of which is adapted to the surface of the rolling element. The inside width between two opposing webs of the two form-locking structures is smaller than the diameter of the rolling element. The inside width between the bottom of a trough of the one form-locking structure and a web opposite thereto of the other form-locking structure is equal to the diameter of the rolling element or somewhat greater than said diameter. Furthermore, the inertia body with the form-locking structure connected thereto is pivotal through a predetermined angle of rotation starting from a rest position. The magnitude of said limited angle of rotation corresponds approximately to the division interval of the troughs of the form-locking structures.

Further features and advantages of the invention will be apparent from the following description of preferred embodiments and from the drawings to which reference is made.

DESCRIPTION OF THE PREFERRED EMBODIMENTS

Figure 1:
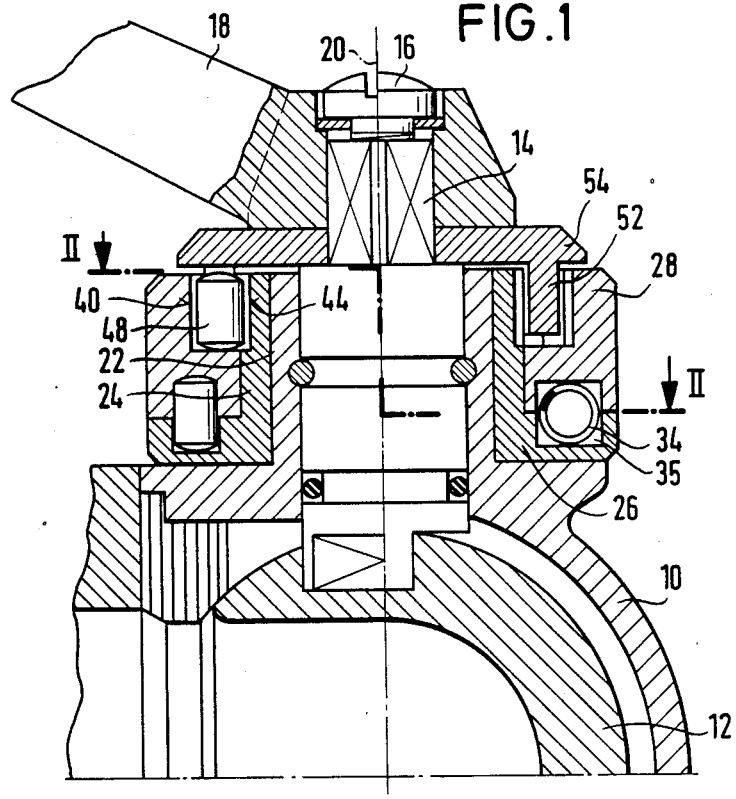
FIG. 1 shows a section of a ball valve or cock through the axis of its shift shaft along the line I—I of FIG. 2.

In the housing 10 of the ball valve a spherical shutoff body 12 is rotatably mounted. Connected to the shutoff body 12 is a shift shaft 14 rotatably mounted in the housing 10. The shift shaft 14 is actuated via a lever 18 secured thereto by means of a screw 16. The axis of the shift shaft is denoted by 20. Since the housing 10 and the shutoff body 12 have no peculiar features compared with conventional ball valves they will not be described in detail here.

Figure 2:
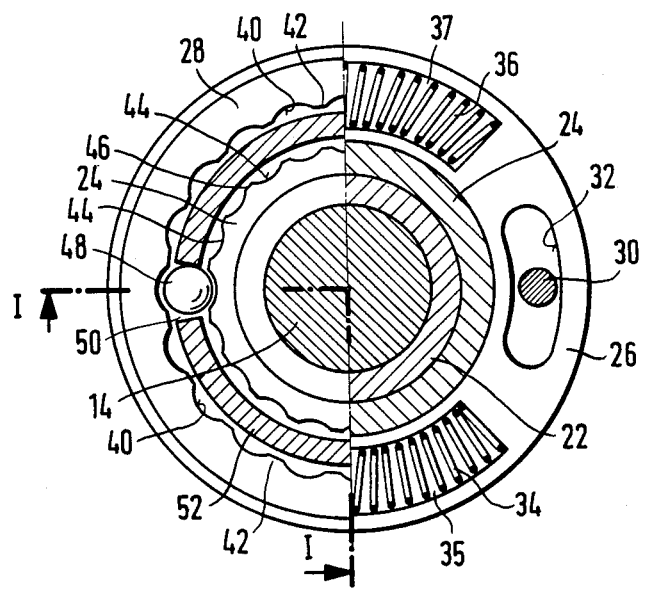
FIG. 2 is a sectional view of the ball valve along the line II—II of FIG. 1.

The control or shift shaft 14 is mounted in a cylindrical extension 22 of the housing 10. Said housing extension 22 is surrounded by a sleeve 24 which is fixed with respect to the housing and which at its end facing the housing 10 merges into a flange 26 and is fixedly connected to the housing 10. The sleeve 24 is in turn surrounded by an annular inertia body 28 which is rotatable about the sleeve 24. The rotary movement of the inertia body 28 is however, as shown in FIG. 2, limited by a stop pin 30 which is inserted into a bore of the inertia body 28 and engages into a slot 32 of the flange 26 fixed with respect to the housing. As further apparent in FIG. 2 the inertia body 28 is held between two cylindrical pressure springs 34, 36 in its centre position in which the stop pin 30 is in the middle of the slot 32 of the flange 26. The pressure springs 34, 36 are each accommodated in an arcuate recess 35, 37, of which the one half is formed in the flange 26 fixed with respect to the housing and the other half is formed in the inertia body 28. Furthermore, the pressure springs 34, 36 each bear at their ends on a radially extending end wall of the associated arcuate recess 35, 37 formed half in the inertia body 28 and half in the housing-fixed flange 26.

The annular inertia body 28 is provided on its inner side with a form-locking structure which consists of a series of troughs 40 extending over the entire periphery which are separated from each other by tooth-like webs 42. Concentric with the form-locking structure formed by the troughs 40 and webs 42 and surrounded by said structure in radial spaced relationship is a further form-locking structure which is formed at the outer side of the sleeve 24 and likewise constituted by a series of troughs 44 extending over the entire periphery and separated from each other by tooth-like webs 46. The troughs 40, 44 and webs 42, 46 lie opposite each other in pairs when the inertia body 28 is in its centre position shown in FIG. 2. The divisions of the two form-locking structures are thus identical. A cylindrical rolling element 48 is arranged between the two form-locking structures. The form of the troughs 40, 44 corresponds to the surface of the rolling element 48. The rolling element 48 is held with small play in a recess 50 of an annular driver 52 which is coaxial with the shift shaft 14 and non-rotatably connected thereto via a flange 54.

Figure 3A:
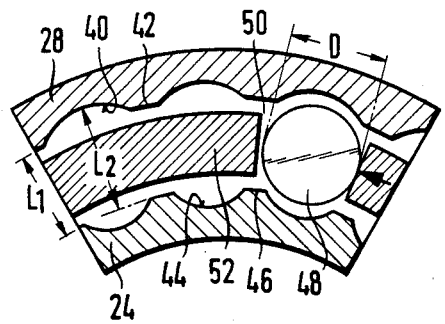
FIGS. 3a to 3g are enlarged partial views of a blocking means of the ball valve shown in FIGS. 1 and 2, in each case in various operating states.
Figure 3B:
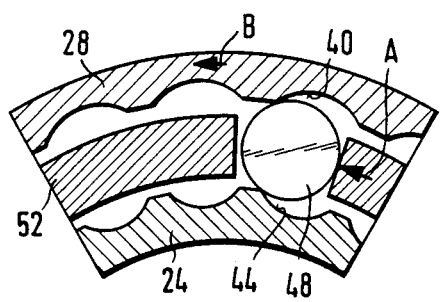
Figure 3C:
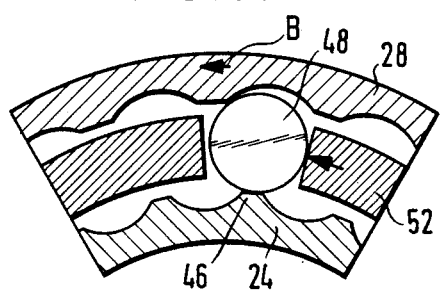
Figure 3D:
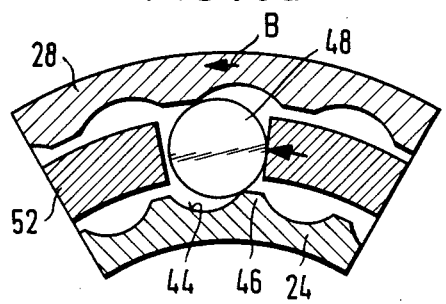
Figure 3E:
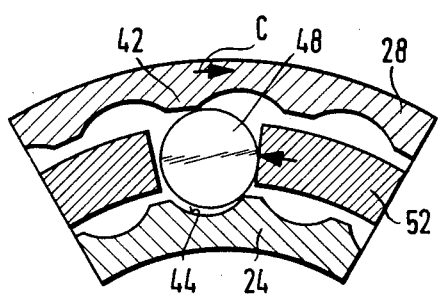
Figure 3F:
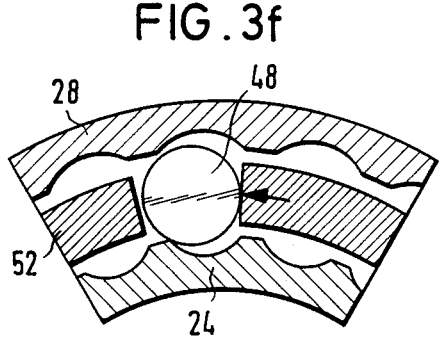
Figure 3G:
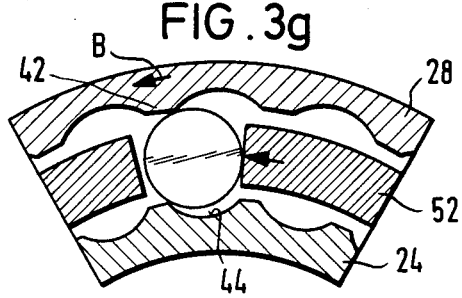

An important point for the mode of operation which will now be explained with reference to FIGS. 3a to 3g is that the inertia body 28 due to the dimensioning of the slot 32 can execute starting from its centre position only a rotary movement which is substantially as great as the division interval between two adjacent troughs 40 and 44. Also of importance is that firstly the inside width $L_1$ (FIG. 3a) between two opposite webs 42, 46 of the two form-locking structures is less than the diameter D of the rolling element 48 and secondly the inside width $L_2$ between the bottom of a trough of the one form-locking structure and an opposing web of the other form-locking structure is equal to the diameter D of the rolling element 48 or is somewhat greater than said diameter In the closure position and open position of the ball valve the inertia body 28 is held by the pressure springs 34, 36 in its centre position shown in FIG. 2, the troughs 40, 44 lying pairwise opposite each other. The rolling element 48 is located on the one hand loosely between two of the opposing troughs 40, 44 and on the other with slight play in the recess 50 of the annular driver 52. Now, if as shown in FIG. 3b the rolling element 48 is entrained by the driver 52 in the direction of the arrow A, the rolling element 48 in turn pressing against a side wall of a trough 40, the annular inertia body 28 is entrained in the direction of the arrow B. On subsequent further rotation of the driver 52 the rolling element 48 is pressed up along the side wall of a trough 44 until, as shown in FIG. 3c, it reaches the apex of a web 46. The annular inertia body 28 is simultaneously entrained by the rolling element 48. On continued rotary movement of the driver 52 the rolling element 48 finally rolls from the apex of the web 46 downwardly and into the following trough 44 of the ring 24 fixed with respect to the housing. As soon as the rolling element 48 has reached the bottom of said trough 44 it frees the tooth-shaped web 42 of the inertia element 28 opposite it. This state is shown in FIG. 3e. The inertia body can now move towards its centre position in the direction of the arrow C (FIG. 3e) under the action of the two pressure springs 34, 36. This rotary movement of the inertia body 28 is however retarded by its inert mass. If the shift shaft 14 is actuated slowly enough the annular inertia body 28 can turn back into its centre position (FIG. 2). The state shown in FIG. 3f then arises. If however the shift shaft 14 is actuated with too high a speed the inertia body 28 does not have enough time to be turned back by the pressure springs 34, 36 into its centre position. On the contrary, the rolling element 48 is entrained by the driver 52 out of the trough 44 and pressed against the next web 42 and therefore tends to entrain the annular inertia body 28 further in the direction of the arrow B. The inertia body 28 has however now turned to such an extent that the stop pin 30 has reached the end of the slot 32 and consequently the inertia body cannot turn any further. In this state shown in FIG. 3g the shift shaft 14 is therefore blocked against any further rotation. Further rotation of the shift shaft 14 is not possible until a slight turning back has been effected to release the inertia body 28 so that the latter can be turned back by the springs 34, 36 into its centre position. As long as the shift shaft 14 is actuated slowly enough the blocking means does not function and actuation between closure position and open position is not restricted in any way.

In the drawings in each case only one rolling element 48 is shown. However, 2, 3 or more such rolling elements may be provided.

In a further embodiment which is not illustrated the annular inertia mass forms an inner ring surrounded by a ring member fixed with respect to the housing. This embodiment is advantageous when the rotatable inertia body is to be accommodated in protected manner.

The maximum possible shift speed without blocking is governed by the inner mass of the inertia body 28 on the one hand and the dimensioning of the springs 34, 36 on the other hand. In spite of the compact form of the blocking means it is easily possible to achieve limiting of the maximum possible shift speed to values at which pontentially damaging high pressure peaks are avoided with certainty. The minimum time for actuation between open position and closure position, i.e. a rotation through an angle of 90°, may for example be a few seconds. With relatively large nominal diameters this minimum time will be greater than with smaller nominal diameters.

In a further embodiment which is also not illustrated the stop pin 30 and slot 32 are omitted. The rotary movement of the annular inertia body 28 is limited solely by the cylindrical pressure springs 34, 36 reaching their blocking length after which they cannot be compressed any further.

What is claimed is:

1. A ball valve comprising a valve housing, a control shaft rotatably mounted in said valve housing, a spherical shutoff body connected to said control shaft which is movable between a closed position and an open position by said control shaft, said control shaft being movable between a closed position and an open position corresponding to said closed and open positions of said shutoff body, and blocking means for blocking said control shaft in its respective position and preventing said control shaft from moving between said closed and open positions when said control shaft is subjected to a movement rate exceeding a predetermined rate, said blocking means comprising an inertia body rotatably mounted on said valve housing, stop means for preventing rotation and changes in the rotational position of said inertia body and movement of said control shaft and said shutoff body between said closed and open positions when said control shaft is subjected to a movement rate exceeding said predetermined rate and for permitting rotation of said inertia body and movement of said control shaft and said shutoff body between said closed and open positions when said control shaft is moved at a rate equal to or less than said predetermined rate, and biasing means for rotating said inertia body against the inertia of said inertia body upon rotation of said control shaft, said blocking means operating in response to the rotational position of said inertia body.

2. The ball valve according to claim 1, wherein said biasing means comprises spring means for holding said inertia body in a centre position and for urging said inertia body toward said centre position when said inertia body is moved to rotary positions deviating from said centre position.

3. The ball valve according to claim 2, wherein said inertia body is rotatable through a limited angle of rotation.

4. Ball valve according to claim 3, wherein the rotary movement of said inertia body is limited by stop means fixed with respect to said valve housing.

5. The ball valve according to claim 3, wherein rotary movement of said inertia body is limited by said spring means being compressed to a state of maximum compression.

6. The ball valve according to claim 1 wherein said blocking means is formed by two concentric annular form-locking structures which lie opposite each other radially spaced apart, one of said form-locking structures being connected to said inertia body and the other of said form-locking structures being fixed with respect to said valve housing, and by at least one rolling element which is arranged between said two form-locking structures and is coupled via a transmission member to said control shaft, said form-locking structures being opposite each other in pairs and following each other in the peripheral direction, each of said form-locking structures comprising recesses which are separated from each other by webs and the form of which is adapted to the surface of said rolling element, the spacing between opposed webs of said form-locking structures being smaller than the diameter of said rolling element and the spacing between the bottom of any said recess of either one of said form-locking structures and one of said webs opposite thereto of the other of said form-locking structures being equal to the diameter of said rolling element or somewhat larger than said diameter, and said inertia body with one of said form-locking structures connected thereto being rotatable from a rest position through a limited angle of rotation which corresponds to the pitch of said recesses of said form-locking structures.

7. The ball valve according to claim 6, wherein said inertia body is annular.

8. The ball valve according to claim 7, wherein said annular inertia body is provided on its inner side with one of said two form-locking structures and surrounding the other said form-locking structure which is fixed with respect to said valve housing.

* * * * *